(12) United States Patent
Giazzon

(10) Patent No.: US 10,585,450 B1
(45) Date of Patent: Mar. 10, 2020

(54) PROTECTIVE COVER FOR A LAPTOP COMPUTER

(71) Applicant: MAX Interactive, Inc., Costa Mesa, CA (US)

(72) Inventor: Albert George Giazzon, San Clemente, CA (US)

(73) Assignee: Max Interactive, Inc., Costa Mesa, CA (US)

(*) Notice: Subject to any disclaimer, the term of this patent is extended or adjusted under 35 U.S.C. 154(b) by 0 days.

(21) Appl. No.: 16/523,182

(22) Filed: Jul. 26, 2019

Related U.S. Application Data

(60) Provisional application No. 62/839,202, filed on Apr. 26, 2019.

(51) Int. Cl.
  *G06F 1/16* (2006.01)
(52) U.S. Cl.
  CPC .... *G06F 1/1616* (2013.01); *G06F 2200/1633* (2013.01)
(58) Field of Classification Search
  CPC combination set(s) only.
  See application file for complete search history.

(56) References Cited

U.S. PATENT DOCUMENTS

| | | | |
|---|---|---|---|
| 6,109,434 A * | 8/2000 | Howard, Jr. | G06F 1/1601 206/320 |
| 6,267,236 B1 * | 7/2001 | Seok | A45C 13/002 206/320 |
| 6,480,377 B2 * | 11/2002 | Genest | G06F 1/1626 345/169 |
| 7,672,117 B1 | 3/2010 | Gary et al. | |
| 7,886,903 B1 * | 2/2011 | Wurzelbacher, Jr. | G06F 1/1616 206/320 |
| 8,613,992 B2 | 12/2013 | Hsu | |
| 8,976,512 B2 * | 3/2015 | Richardson | G06F 1/1626 361/679.01 |
| 9,025,317 B2 * | 5/2015 | Richardson | H04M 1/0252 361/679.01 |
| 9,380,854 B2 | 7/2016 | Hamra | |
| 9,703,330 B2 * | 7/2017 | Johnson | H04M 1/0252 |
| 9,723,113 B2 * | 8/2017 | Thompson | G06F 1/1628 |
| 9,735,827 B2 * | 8/2017 | Richardson | G06F 1/1626 |

(Continued)

FOREIGN PATENT DOCUMENTS

WO  WO2013069005  5/2013

*Primary Examiner* — Lisa Lea-Edmonds
(74) *Attorney, Agent, or Firm* — Eric Karich; Karich & Associates

(57) ABSTRACT

A protective cover has a top cover and a bottom cover which are separate from each other, and are not connected. The top cover has a main body that extends to an outer perimeter, the outer perimeter including an upwardly extending wall which extends upwardly from the outer perimeter. A first adhesive element is disposed on the top cover adjacent the outer perimeter for permanently bonding the top cover to a screen portion of a laptop computer. The bottom cover includes a main body having corners which extend into longitudinally extending elongate arms which each have an upwardly extending wall. A second adhesive element is disposed on the main body of the bottom cover, and each of the longitudinally extending elongate arms, adapted for permanently bonding the bottom cover to the keyboard portion of the laptop computer.

5 Claims, 4 Drawing Sheets

(56) References Cited

U.S. PATENT DOCUMENTS

| | | |
|---|---|---|
| 9,753,494 B2 * | 9/2017 | Laine .................... G06F 1/1626 |
| 9,778,702 B2 | 10/2017 | Song et al. |
| 10,078,347 B2 * | 9/2018 | Aurongzeb ........... G06F 1/1637 |
| 1,021,622 A1 | 2/2019 | Fenton et al. |
| 10,234,898 B2 | 3/2019 | Bekele |
| 10,258,127 B2 * | 4/2019 | Johnson .............. H04M 1/0252 |
| 10,303,208 B2 * | 5/2019 | Aurongzeb ........... G06F 1/1647 |
| 2005/0187784 A1 | 8/2005 | Bander et al. |
| 2006/0042996 A1 * | 3/2006 | Picot ..................... A45C 13/02 |
| | | 206/586 |
| 2006/0226040 A1 | 10/2006 | Medina |
| 2008/0308437 A1 | 12/2008 | Lin |
| 2010/0110629 A1 | 5/2010 | Dietz et al. |
| 2014/0063784 A1 | 3/2014 | Muiter |
| 2016/0182129 A1 * | 6/2016 | Del Toro ................ G06F 16/00 |
| | | 340/572.1 |
| 2016/0338459 A1 * | 11/2016 | Yow ....................... A45C 11/00 |
| 2017/0112249 A1 | 4/2017 | Peterson |
| 2017/0153663 A1 * | 6/2017 | Aurongzeb ............. H01L 27/32 |
| 2019/0086953 A1 * | 3/2019 | Chavannes ............... G06F 1/16 |

* cited by examiner

US 10,585,450 B1

PROTECTIVE COVER FOR A LAPTOP COMPUTER

CROSS-REFERENCE TO RELATED APPLICATIONS

This application for a utility patent claims the benefit of U.S. Provisional Application No. 62/839,202, filed Apr. 26, 2019.

BACKGROUND OF THE INVENTION

Field of the Invention

This invention relates generally to protective covers, and more particularly to a protective cover for use with a laptop computer.

Description of Related Art

The prior art teaches many forms of covers for computers and computer components.

Chavannes, U.S. 2019/0086953, for example, teaches a single protective cover for protecting the screen of a portable computer, the cover having a plastic central core and an aluminum outer shell. Four adhesive strips are applied to the outer shell so that its width is parallel to the pair of opposed major edges. The adhesive strip is spaced from one of the opposed major edges by approximately one-half the adhesive strip's height and is spaced from one of the opposed minor edges by a distance of approximately the adhesive strip's height.

Picot, U.S. 2006/0042996, teaches a protective cover for a laptop intended to be directly or indirectly separately mounted on the upper surface or screen and lower surface or base of the latter, respectively. The covers are attached via an adhesive or Velcro, in a manner that allows relative movement.

Hsu, U.S. Pat. No. 8,613,992, teaches a protective cover of an electronic device that includes a leather protective cover, which includes an outside surface and a bottom surface. An adhesive construction is attached to the bottom surface of the leather layer. The adhesive construction includes a lower adhesive layer (acrylic, rubber, or silicone based adhesive) for strongly bonding a middle substrate (non-woven fabric, PET, about 0.05-0.1 mm thick) to the leather layer. A weaker upper adhesive layer is provided for bonding the cover to the electronic device, bonding between 0.5-1.0 Kg/square inch, so that the protective cover may be readily attached and detached from the electronic device.

The present invention better fulfills the needs of the marketplace and provides further advantages as described in the following summary.

SUMMARY OF THE INVENTION

The present invention teaches certain benefits in construction and use which give rise to the objectives described below.

The present invention provides a protective cover for a laptop computer. The protective cover includes a top cover and a bottom cover which are separate from each other, and are not connected in any way. The top cover has a main body that extends to an outer perimeter, the outer perimeter including an upwardly extending wall which extends upwardly from the outer perimeter. A first adhesive element is disposed on the top cover adjacent the outer perimeter for permanently bonding the top cover to a screen portion of the laptop computer. The bottom cover includes a main body having corners which extend into longitudinally extending elongate arms which each have an upwardly extending wall. A second adhesive element is disposed on the main body of the bottom cover, and each of the longitudinally extending elongate arms, adapted for permanently bonding the bottom cover to the keyboard portion of the laptop computer.

A primary objective of the present invention is to provide a protective cover for a laptop computer having advantages not taught by the prior art.

Another objective is to provide a protective cover which can be permanently bonded to a laptop computer via adhesives.

A further objective is to provide a protective cover having a top cover and a bottom cover which are not connected.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a protective cover 10 for a laptop computer 12. The laptop computer 12 is particularly adapted for use in schools and by schoolchildren, though the protective cover 10 may be used in other fields (e.g., in commercial usage, construction, first responders, military, etc., or in any other environment where a user may wish to protect a laptop computer). The protective cover 10 of this invention is secured to the laptop computer 12 via an adhesive element, described in greater detail below, so that the protective cover 10 may not be removed, and if the laptop computer 12 is dropped or otherwise impacted, the protective cover 10 remains in place.

Figure 1:
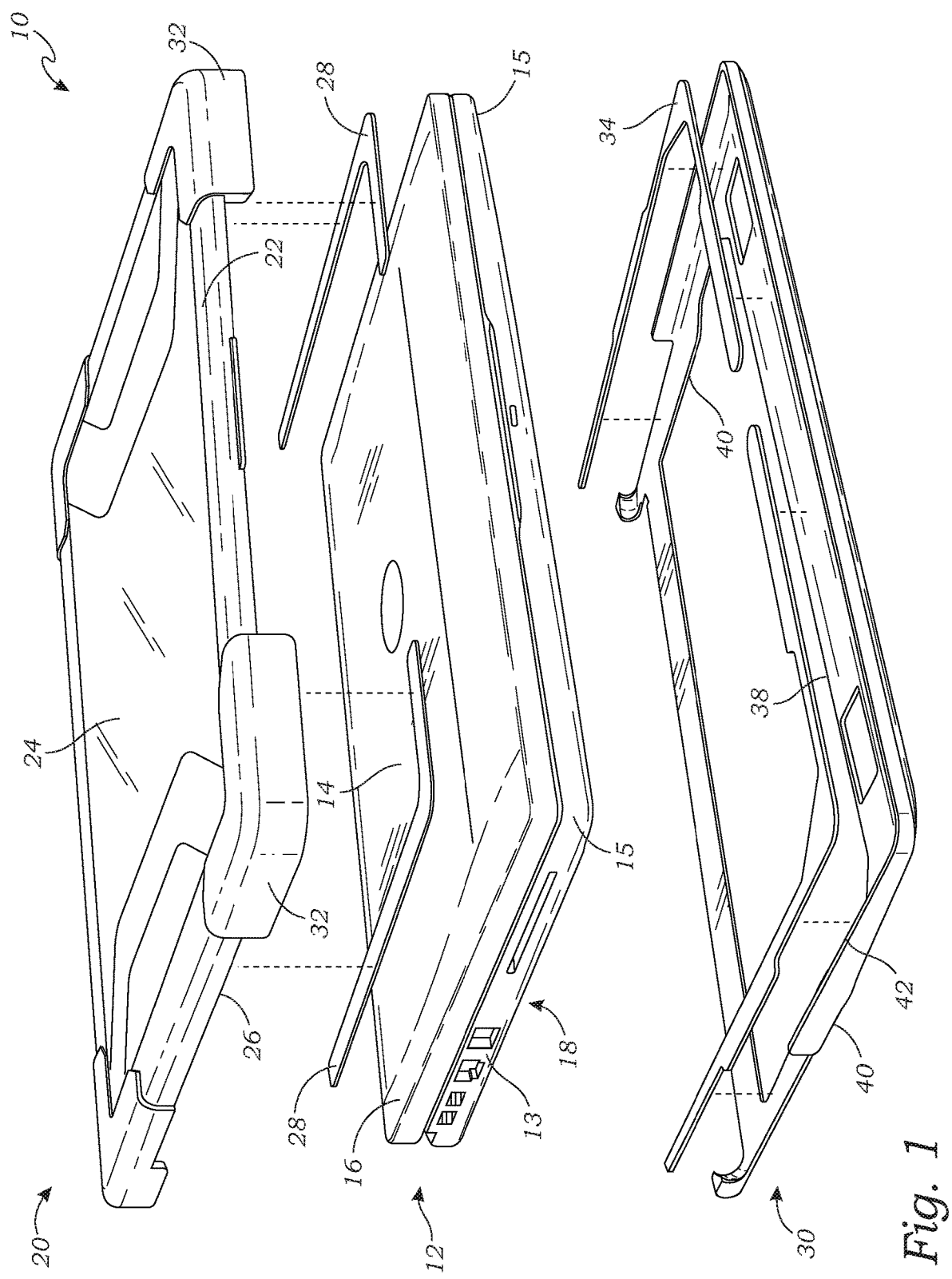
FIG. 1 is an exploded top perspective view of a protective cover for a laptop computer according to one embodiment of the present invention.
Figure 2:
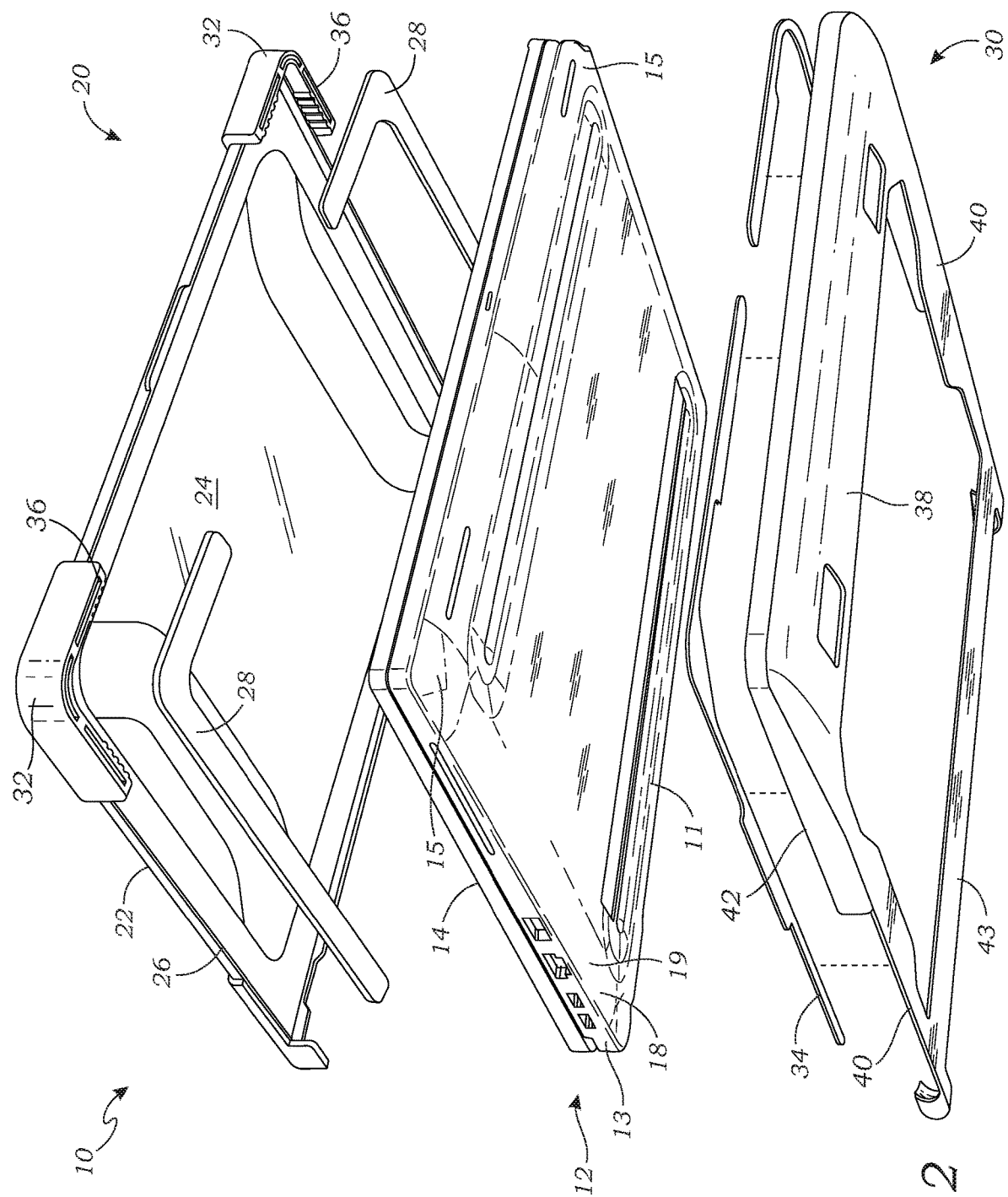
FIG. 2 is an exploded bottom perspective view thereof.

FIG. 1 is an exploded top perspective view of one embodiment of the protective cover 10. FIG. 2 is an exploded bottom perspective view of the protective cover 10. As shown in FIGS. 1-2, the protective cover 10 includes a top cover 20 and a bottom cover 30, which are constructed as two separate components, and are not attached via a hinge or other connection.

The top cover 20 and the bottom cover 30 may be manufactured and sold as single product set, or alternatively sold individually.

As shown in FIGS. 1-2, the top cover 20 is adapted to be mounted on a screen portion 14 of a laptop 12. As discussed in greater detail below, the top cover 20 is permanently mounted to an outer edge 16 of the screen portion 14 via a first adhesive element 28, described in greater detail below. The bottom cover 30 is permanently mounted to an outer edge 19 of the keyboard portion 18 of the laptop 12 via a second adhesive element 34, also described in greater detail below.

Figure 3:
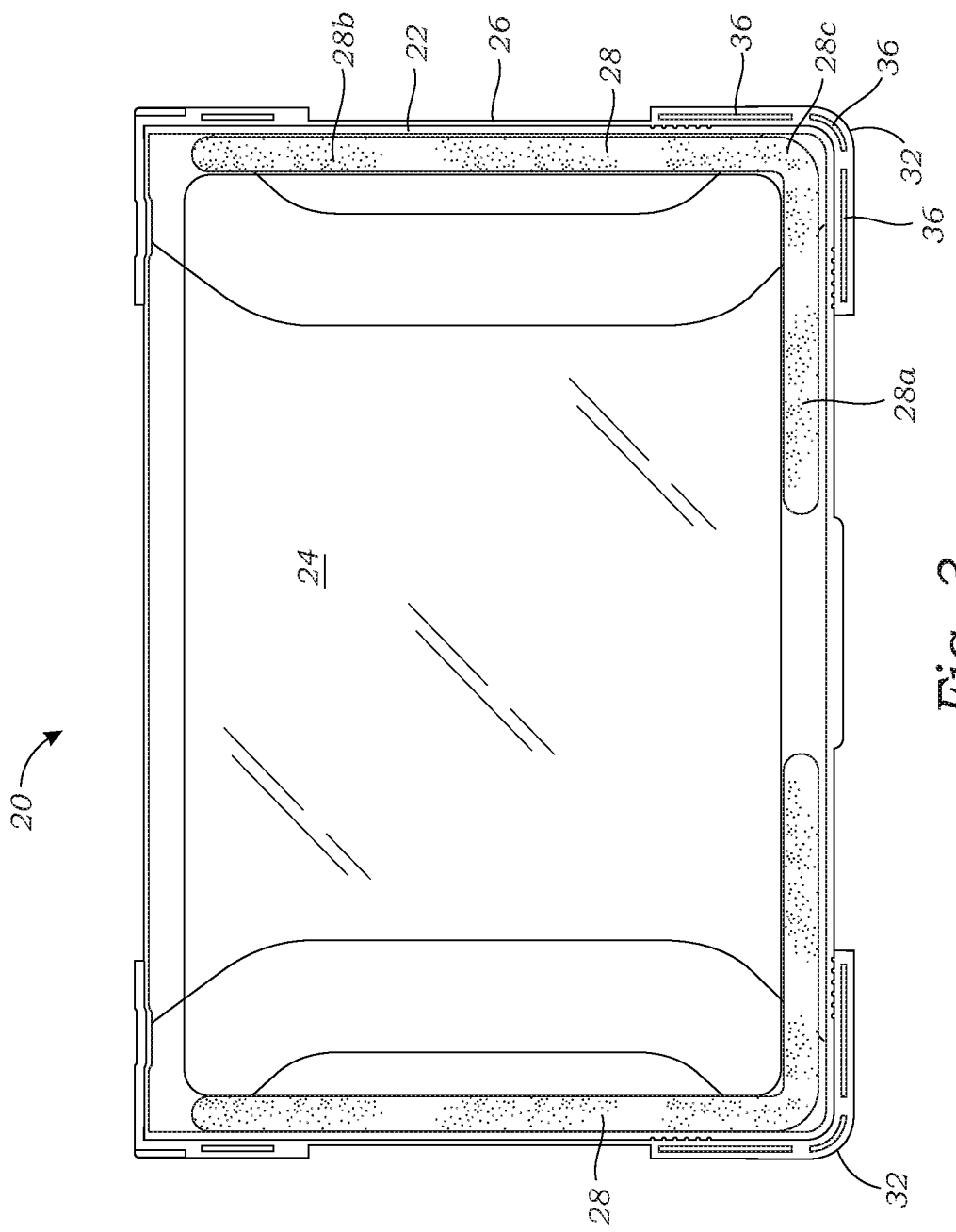
FIG. 3 is a top plan view of a top cover of the protective cover.

FIG. 3 is a top plan view of the top cover 20. As shown in FIGS. 1-3, the top cover 20 includes a main body 24 that extends to an outer perimeter 22. In this embodiment, the outer perimeter 22 of the protective cover 10 may be constructed as a resilient material, such as thermoplastic polyurethane (TPU), thermoplastic elastomer, or other suitable resilient material (e.g., silicone, soft plastic, rubber, etc.), while the main body 24 is constructed of a rigid material such as polycarbonate. In this embodiment, the outer perimeter 22 is co-molded with the main body 24.

As shown in FIGS. 1-3, the protective cover 10 may further include resilient corners 32, to further protect the laptop in case of a fall. In this embodiment, the corners 32 project outwardly and downwardly far enough to provide protection to the laptop computer 12 without the use of the bottom cover 30. For example, many new laptops are designed to survive a drop from roughly the height of a desk, and have further added features such as rubber bumpers, reinforced ports and hinges, and mechanically anchored keys. The top cover 20 complements this modern laptop design, by providing the front corners 32 which are thicker than the rest of the outer perimeter 22 and have a set of clefts 36 on the inner edge of the corners 32, thereby providing further protection to the corners of the laptop 12.

The outer perimeter 22 is shaped and adapted to correspond with the outer edge 16 of the laptop, having an upwardly extending wall 26 which extends upwardly from the outer perimeter 22. The upwardly extending wall 26 may include portions which are lower, so that a user may access portions of the laptop 12 such as a power connection, media drive, etc., while the protective cover 10 is installed.

The first adhesive element 28 may be mounted adjacent the outer perimeter 22. In this embodiment, the first adhesive element 28 includes a pair of separate pieces of adhesive tape that each include a lateral section 28a and a longitudinal section 28b that are connected at a corner 28c so that they form an angle of about 90 degrees. While this configuration has provided excellent results, alternative configurations may also be used by one skilled in the art, and such alternative configurations should be considered within the scope of the present invention.

Figure 4:
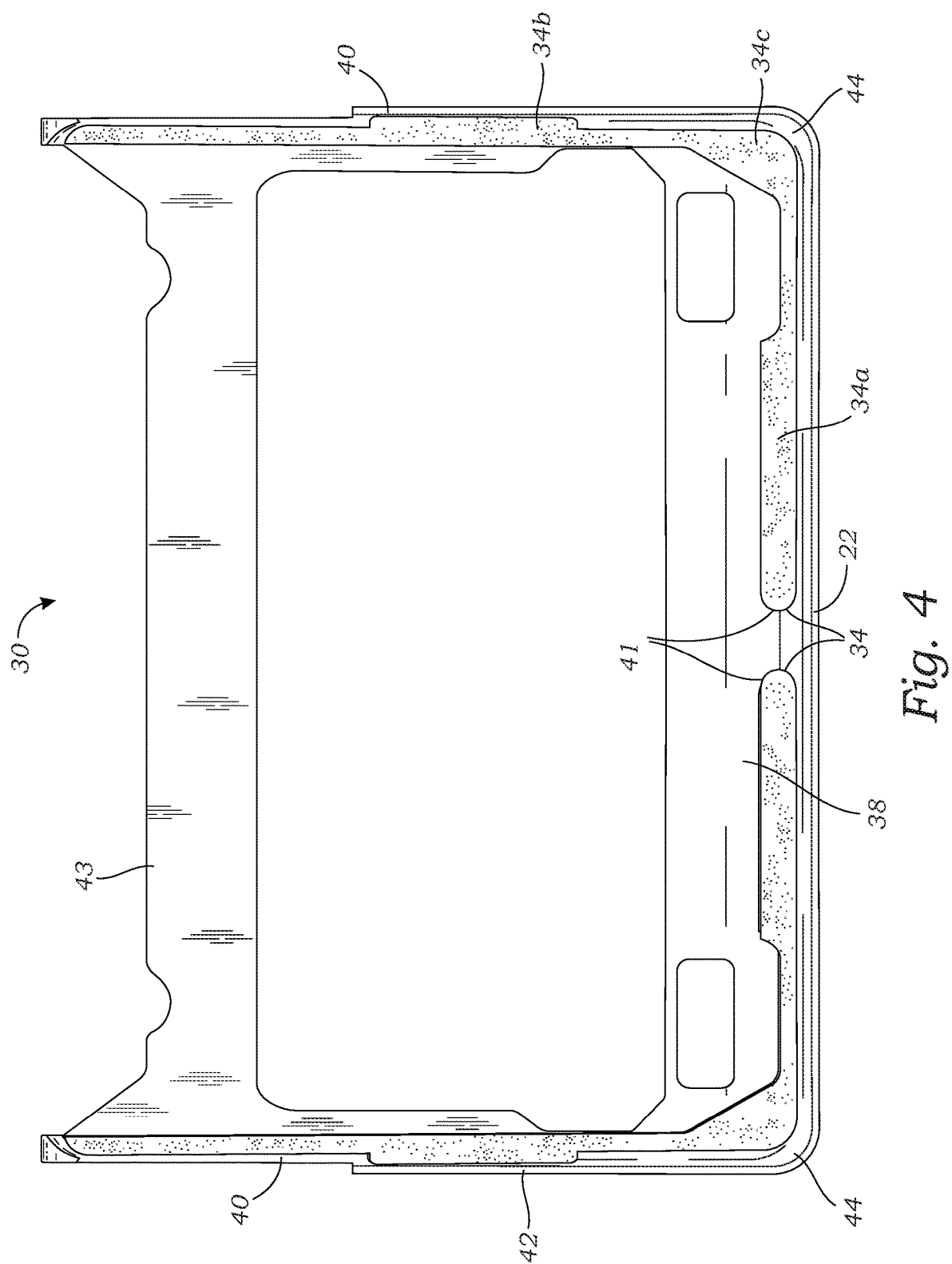
FIG. 4 is a top plan view of a bottom cover of the protective cover.

FIG. 4 is a top plan view of the bottom cover 30. In the embodiment of FIGS. 1-2 and 4, the bottom cover 30 has a main body 38 which extends laterally, and two elongate arms 40 extending perpendicular to the main body 38. In this embodiment, a rear strip 43 may join the elongate arms 40, for covering a rear section 11 of the keyboard portion 18, described in greater detail below. These components form a generally rectangular construction. In other embodiments, the bottom cover may leave the rear section 11 of the keyboard portion 18 open, without the rear strip 43. The main body 38 and the elongate arms 40 further include an upwardly extending wall 42 for gripping the laptop 12. The upwardly extending wall 42 may include portions which are lower, so that a user may access portions of the laptop 12 such as a power connection, media drive, etc., while the protective cover 10 is installed.

The main body 38 includes corners 44, which may conform to front corners 15 of the keyboard portion 18, the main body 38 extending laterally therebetween. The two elongate arms 40 extend longitudinally from the corners 44, toward a rear section 11 of the keyboard portion 18, such that the bottom cover 30 may be installed around both sides 13, the front corners 15, and the rear section 11 of the keyboard portion 18.

As shown in the embodiment of FIG. 4, the second adhesive element 34 may be in the form of adhesive strips, which may be cut and sized for placement on the main body 38 where it meets the upwardly extending wall 26. In this embodiment, the second adhesive element 34 includes a pair of separate pieces of adhesive tape that each include a lateral section 34a and a longitudinal section 34b that are connected at a corner 34c so that they form an angle of about 90 degrees. In other embodiments, the adhesive element 34 may be in the form of any number of strips, in any combination to cover the bottom cover 30, and may have portions that widen to secure the strips onto any portion of the bottom cover 30 that may beneficially receive the adhesive element 34.

In some embodiments, there may be channels 41 behind the upwardly extending wall 42 and/or 60 shaped to accept the adhesive element 34. However, in other embodiments, the strips may be cut and sized for placement on any surface of the protective cover 10, in any number of locations deemed suitable by those skilled in the art. In one embodiment, the strips may be die cut, to assist in manufacturing and attachment to the protective cover 10.

As shown in FIGS. 1-4, the combination of the adhesive elements 28 and 34 provides a durable attachment of the cover 10 to the laptop 12, capable of passing drop tests of a minimum of four feet, particularly on hard surfaces, and durable enough to withstand hitting the corner of the laptop 12, without detachment of the protective cover 10 from the laptop 12.

The adhesive elements 28 and 34 may be adhesive tape having double-sided bonding to a broad range of surface energy substrates (e.g., metals, glass, plastics, etc.), and which can functionally replace mechanical fasteners (rivets, welds, screws, etc.) or liquid adhesives. Materials for the adhesive elements 28 and 34 may include a variety of powerful adhesives known in the art, such as cyanoacrylates, structural acrylics, or any other suitable material known in the art. In this embodiment, a 3M™ VHB™ tape is used, such as a white or clear double coated acrylic foam tape with paper liner, a thick black double coated acrylic foam tape with PET liner, etc. Each 3M™ VHB™ tape has low surface energy adhesive, creates a permanent seal against water, moisture, etc., and allows the use with a wide range of different materials. Virtually invisible fastening keeps surfaces smooth, while pressure sensitive adhesive bonds on contact to provide immediate handling strength.

The prior art teaches many laptop cases that utilize weak adhesives so that the cases may be easily removed simply by peeling the case off, or pulling with sufficient force. In this embodiment, a stronger and more permanent bond is utilized, contrary to the teachings of the prior art. For purposes of this application, the term "permanent" is hereby defined to mean the protective cover 10 cannot be removed from the laptop 12 without physically damaging the tape, the protective cover 10, and/or the surface of the laptop 12 itself, or without the use of specialized tools (e.g., heating tools for melting the adhesives). Removal of the adhesive element 34 would only be done by a professional with proper experience and tools to accomplish the removal without damage, e.g., a laptop repair specialist (trained to remove commercial grade adhesives as part of the repair process).

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A protective cover for a laptop computer having a screen portion and a keyboard portion, the protective cover comprising:
   a top cover having a main body that extends to an outer perimeter, the outer perimeter including an upwardly extending wall which extends upwardly from the outer perimeter;
   a first adhesive element disposed on the top cover adjacent the outer perimeter adapted for permanently bonding the top cover to the screen portion of the laptop computer;
   a bottom cover with a main body having corners which extend into longitudinally extending elongate arms which each have an upwardly extending wall;
   a second adhesive element disposed on the main body of the bottom cover, and each of the longitudinally extending elongate arms, adapted for permanently bonding the bottom cover to the keyboard portion of the laptop computer; and
   wherein the top cover and the bottom cover are not connected to each other.

2. The protective cover of claim 1, wherein the first and second adhesive elements are in the form of a pair of generally L-shaped strips.

3. The protective cover of claim 1, wherein the elongate arms of the bottom cover are joined together by a laterally extending rear edge, forming a generally rectangular frame.

4. The protective cover of claim 1, wherein the bottom cover includes channels behind the upwardly extending wall shaped to accept the second adhesive element.

5. The protective cover of claim 1, wherein the top cover has shock absorbing front corners which project outwardly far enough to shield both the screen portion and the keyboard portion of the laptop computer.

* * * * *